United States Patent
Suzuki et al.

(10) Patent No.: US 9,280,498 B2
(45) Date of Patent: Mar. 8, 2016

(54) DATA CONTROL SYSTEM, DATA CONTROL METHOD, AND DATA CONTROL PROGRAM

(75) Inventors: Jun Suzuki, Tokyo (JP); Masahiko Takahashi, Tokyo (JP); Youichi Hidaka, Tokyo (JP); Teruyuki Baba, Tokyo (JP); Takashi Yoshikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/002,945

(22) PCT Filed: Feb. 23, 2012

(86) PCT No.: PCT/JP2012/001229
§ 371 (c)(1),
(2), (4) Date: Sep. 3, 2013

(87) PCT Pub. No.: WO2012/117701
PCT Pub. Date: Sep. 7, 2012

(65) Prior Publication Data
US 2013/0346643 A1    Dec. 26, 2013

(30) Foreign Application Priority Data
Mar. 2, 2011 (JP) .................................. 2011-044951

(51) Int. Cl.
G06F 13/28    (2006.01)
G06F 13/16    (2006.01)
G06F 13/10    (2006.01)

(52) U.S. Cl.
CPC .............. *G06F 13/16* (2013.01); *G06F 13/102* (2013.01); *G06F 13/28* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 5,787,481 A * | 7/1998 | Boutaud et al. | 711/151 |
| 7,240,350 B1 * | 7/2007 | Eberhard et al. | 719/314 |
| 8,296,478 B2 * | 10/2012 | Torigoe et al. | 710/22 |
| 2004/0019711 A1 * | 1/2004 | Bissessur et al. | 710/22 |
| 2004/0117368 A1 * | 6/2004 | Saha et al. | 707/6 |
| 2005/0165983 A1 * | 7/2005 | Nam | 710/52 |
| 2005/0229000 A1 | 10/2005 | Shoji et al. | |

(Continued)

FOREIGN PATENT DOCUMENTS

| CN | 1633649 A | 6/2005 |
|---|---|---|
| EP | 0732659 A1 | 9/1996 |

(Continued)

OTHER PUBLICATIONS

International Search Report for PCT Application No. PCT/JP2012/001229 mailed on May 22, 2012.

(Continued)

*Primary Examiner* — Elias Mamo

(57) ABSTRACT

A CPU 80 controls data transfer from a first device to a second device in a kernel mode. A main memory 90 stores data to be transferred from the first device to the second device. The CPU 80 has: a first device control means 81 which controls the first device; a second device control means which controls the second device; and a data transfer control means 83 which makes a read instruction which instructs the first device control means 81 to store data read from the first device in the main memory 3, and makes a write instruction which instructs the second device control means 82 to write the data stored in the main memory 3 in the second device.

12 Claims, 13 Drawing Sheets

(56) References Cited

U.S. PATENT DOCUMENTS

| | | | |
|---|---|---|---|
| 2005/0256977 A1* | 11/2005 | Dehaemer et al. | 710/5 |
| 2006/0117119 A1* | 6/2006 | Emerson et al. | 710/22 |
| 2007/0245043 A1 | 10/2007 | Wu | |
| 2010/0191874 A1* | 7/2010 | Feeley et al. | 710/24 |
| 2011/0131351 A1* | 6/2011 | Noeldner et al. | 710/52 |

FOREIGN PATENT DOCUMENTS

| | | |
|---|---|---|
| JP | 8-44652 A | 2/1996 |
| JP | 10-143437 A | 5/1998 |
| JP | 10-333924 A | 12/1998 |
| JP | 2001-159956 A | 6/2001 |
| JP | 2009-230484 A | 10/2009 |
| WO | 03/069492 A1 | 8/2003 |

OTHER PUBLICATIONS

The Extended European Search Report for EP Application No. EP12752370.2 dated on Jan. 23, 2015.
Chinese Office Action for CN Application No. 201280008715.0 issued on Apr. 1, 2015 with English Translation.
Chinese Office Action for CN Application No. 201280008715.0 issued on Dec. 2, 2015 with English Translation.

\* cited by examiner

DATA CONTROL SYSTEM, DATA CONTROL METHOD, AND DATA CONTROL PROGRAM

This application is a National Stage Entry of PCT/JP2012/001229 filed Feb. 23, 2012, which claims priority from Japanese Patent Application 2011-044951 filed Mar. 2, 2011, the contents of all of which are incorporated herein by reference, in their entirety.

TECHNICAL FIELD

The present invention relates to a data control system, a data control method, and a data control program which perform control of moving data at a high speed between two I/O (Input/Output) devices.

BACKGROUND ART

Patent Literature 1 discloses a computer system which can directly transfer movie data from a DVD (Digital Versatile Disc)—ROM (Read Only Memory) interface to a DVD decoder without a main memory. In the computer system disclosed in Patent Literature 1, the DVD decoder has a master transaction control unit which can start an I/O read transaction, and further controls both of the DVD decoder and the DVD interface by a DVD control driver. According to this configuration, movie data is directly transferred from the DVD interface to the DVD decoder without a main memory.

Patent Literature 2 discloses a calculator system which can execute a plurality of input/output commands with respect to a plurality of devices by one input/output command. The calculator system disclosed in Patent Literature 2 starts an input/output operation when an input/output adaptor receives an input/output command from a CPU. The input/output adaptor transfers data specified by a memory unit to an appropriate input/output control device upon data transmission, and transfers data from the input/output control device to a specified area of the memory unit upon data reception. Meanwhile, the input/output control device has a buffer which stores data.

In addition, Patent Literature 3 discloses a storage subsystem which replaces firmware without stopping an operation. In the system disclosed in Patent Literature 3, a CPU allocates a data cache area in a memory area and controls a disk control unit to read data from a logical disk. Further, the CPU stores the read data in the data cache area of the memory area.

CITATION LIST

Patent Literature

PLT 1: Japanese Patent Application Laid-Open No. 10-143437
PLT 2: Japanese Patent Application Laid-Open No. 8-44652
PLT 3: Japanese Patent Application Laid-Open No. 2009-230484

SUMMARY OF INVENTION

Technical Problem

An example of a common system which uses the computer system disclosed in Patent Literature 1 will be described. FIG. 15 depicts an explanatory view illustrating an example of a common data transfer system which uses the computer system disclosed in Patent Literature 1. The system illustrated in FIG. 15 has a CPU 1, a main memory 3, a DVD decoder 406, a DVD interface 407, and a bridge 2 which connects respective devices.

The DVD decoder 406 and the DVD interface 407 are connected to the bridge 2 through a PCI (Peripheral Component Interconnect) express bus 501 and a PCI express bus 502.

The main memory 3 stores a program 305. The program 305 is read by the CPU 1, and operates as an application operating unit 111, an operating system operating unit 112 and a DVD control driver operating unit 113. Further, the application operating unit 111 operates according to a program which plays back movie data. The DVD control driver operating unit 113 controls a DVD decoder 406 and a DVD interface 407. The common system employing such a configuration operates as follows.

That is, when the application operating unit 111 makes a movie data playback request, the DVD control driver operating unit 113 instructs the DVD interface 407 to prepare for data transfer. Subsequently, the DVD control driver operating unit 113 instructs the DVD decoder 406 to start an I/O transaction for reading movie data from the DVD interface 407. By this means, the movie data is directly transferred from the DVD interface 407 to the DVD decoder 406.

This common system directly transfers data from the DVD interface 407 to the DVD decoder 406 without the main memory 3, so that it is possible to reduce bus traffic. Further, this common system does not transfer data through software and, consequently, can realize high speed data transfer.

However, the system disclosed in Patent Literature 1 has a problem that it is not possible to realize high speed data transfer between two I/O devices which do not support an operation of direct data transfer. That is, like the system disclosed in Patent Literature 1, when two I/O devices connected to PCI express buses directly transfer data, there is a problem that the I/O devices need to support this transfer processing. Generally, an I/O device transfers data only to and from a main memory by being controlled by a device driver operated by a CPU, and therefore does not support an operation of directly transferring data between two I/O devices.

Further, to move data from one I/O device to another I/O device, the calculator system disclosed in Patent Literature 2 needs to introduce another device such as an input/output adaptor which plays an alternative role of processing of the I/O device, in a system.

Hence, even upon transfer processing between I/O devices which do not support an operation of direct data transfer as in the calculator system disclosed in Patent Literature 2, it is desirable to reduce an overhead and transfer data at a high speed.

It is therefore an exemplary object of the present invention to provide a data control system, a data control method and a data control program which can transfer data at a high speed between two I/O devices which do not support an operation of direct data transfer.

Solution to Problem

A data control system according to the present invention has: a CPU which controls data transfer from a first device to a second device in a kernel mode; a main memory which stores data to be transferred from the first device to the second device, and the CPU has: a first device control means which controls the first device; a second device control means which controls the second device; and a data transfer control means which makes a read instruction which instructs the first device control means to store data read from the first device in the main memory, and makes a write instruction which instructs the second device control means to write the data stored in the main memory, in the second device.

A data control method according to the present invention includes: at a CPU which controls data transfer from a first device to a second device in a kernel mode, instructing a first device control means which controls the first device of the CPU to store data read from the first device in a main memory; and at the CPU, instructing a second device control means which controls the second device of the CPU to write the data stored in the main memory, in the second device.

A data control program according to the present invention is a data control program which is applied to a computer which has: a CPU which controls data transfer from a first device to a second device in a kernel mode; and a main memory which stores data to be transferred from the first device to the second device, and causes the computer to execute: first device control processing of controlling the first device; second device control processing of controlling the second device; and data transfer control processing of making a read instruction which instructs in the first device control processing to store data read from the first device in the main memory, and making a write instruction which instructs in the second device control processing to write the data stored in the main memory, in the second device.

Advantageous Effects of Invention

The present invention can transfer data at a high speed between two I/O devices which do not support an operation of direct data transfer.

DESCRIPTION OF EMBODIMENTS

Hereinafter, exemplary embodiments of the present invention will be described with reference to the drawings.

First Exemplary Embodiment

Figure 1:
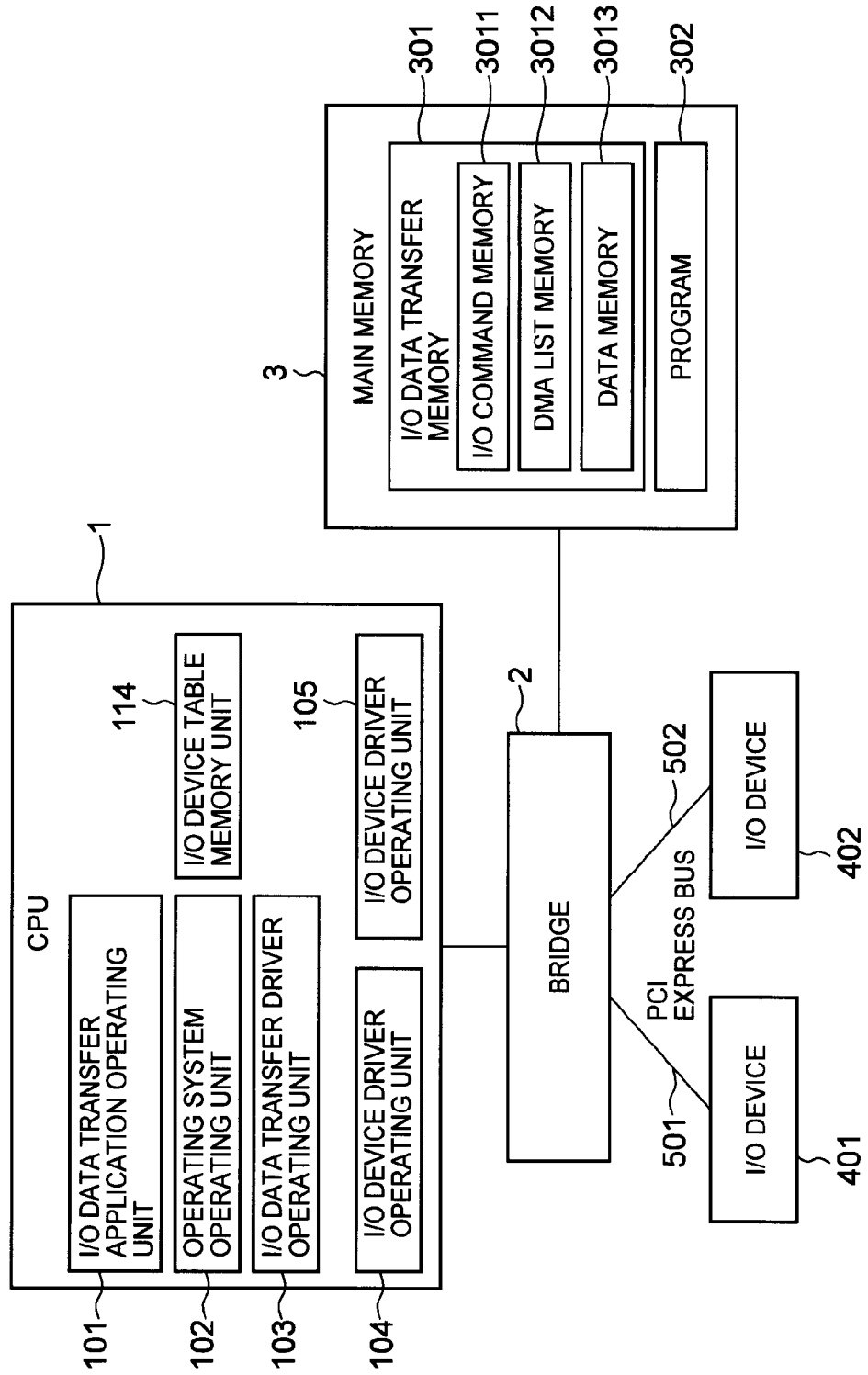
FIG. 1 It depicts a block diagram illustrating an example of a data control system according to a first exemplary embodiment of the present invention.

FIG. 1 depicts a block diagram illustrating an example of a data control system according to a first exemplary embodiment of the present invention. The data control system according to the present exemplary embodiment has a CPU 1, a main memory 3, an I/O device 401 which is a first I/O device, an I/O device 402 which is a second I/O device and a bridge 2 which connects these I/O devices. In addition, in the present exemplary embodiment, data is transferred from the I/O device 401 to the I/O device 402.

The I/O device 401 and the I/O device 402 are I/O devices which hold interfaces which comply with PCI expresses such as storage devices and network interfaces which comply with standards such as SCSI (Small Computer System Interface) or SATA (Serial Advanced Technology Attachment). The I/O device 401 and the I/O device 402 are connected to the bridge 2 through a PCI express bus 501 and a PCI express bus 502, respectively.

The main memory 3 has an I/O data transfer memory 301. The I/O data transfer memory 301 is used to transfer data between the I/O device 401 and the I/O device 402.

The I/O data transfer memory 301 has an I/O command memory 3011, a DMA list memory 3012 and a data memory 3013. The I/O command memory 3011 is an area which stores I/O commands to be issued to the I/O device 401 and the I/O device 402. The data memory 3013 is a buffer area of data transferred between the I/O device 401 and the I/O device 402. The DMA list memory 3012 is an area which stores information obtained by listing addresses in the data memory 3013 to allow the I/O device 401 and the I/O device 402 to perform data communication with the data memory 3013 by way of DMA (Direct Memory Access).

Further, the main memory 3 stores a program 302. The program 302 is read by the CPU 1, and operates as an I/O data transfer application operating unit 101, an operating system operating unit 102, an I/O data transfer driver operating unit 103, an I/O device driver operating unit 104 which controls the I/O device 401, and an I/O device driver operating unit 105 which controls the I/O device 402 described below.

The CPU 1 has the I/O data transfer application operating unit 101, the operating system operating unit 102, the I/O data transfer driver operating unit 103, the I/O device driver operating unit 104, the I/O device driver operating unit 105 and an I/O device table memory unit 114.

The I/O device table memory unit 114 stores information of the I/O device 401 and the I/O device 402 which are data transfer targets. More specifically, the I/O device table memory unit 114 stores names of the I/O device 401 and the I/O device 402 in association with addresses (referred to as "management information addresses" below) indicating positions at which management information of the I/O device 401 and the I/O device 402 held by the operating system operating unit 102. In addition, management information of a device includes, for example, attributes and an access mode of the device.

The I/O data transfer application operating unit 101 requests the data transfer driver operating unit 103 to transfer data between the I/O device 401 and the I/O device 402. The data transfer request is instructed by, for example, a user or another device.

The operating system operating unit 102 causes the I/O data transfer driver operating unit 103, the I/O device driver operating unit 104 and the I/O device driver operating unit 105 to operate as driver software. Further, the operating system operating unit 102 creates information obtained by associating a device name and a management information address in the I/O device table memory unit 114. When, for example, an I/O device is connected, the operating system operating unit 102 may associate and store a device name of the connected I/O device and an address at which the management information of this device is stored, in the I/O device table memory unit 114.

Figure 2:
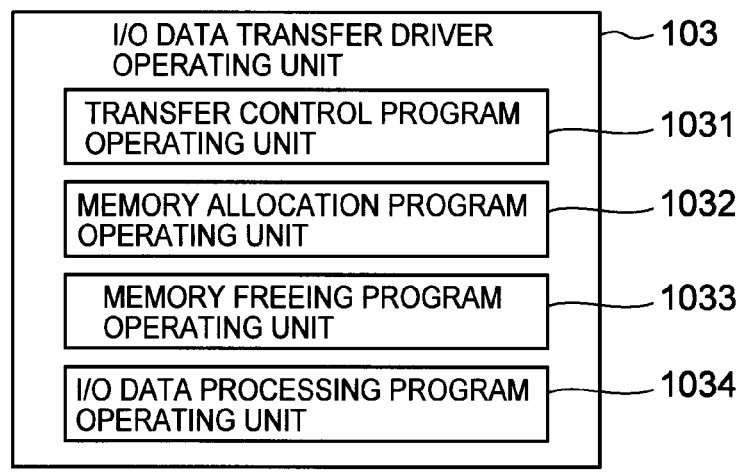
FIG. 2 It depicts a block diagram illustrating an example of an I/O data transfer driver operating unit.

The I/O data transfer driver operating unit 103 controls data transfer from the I/O device 401 to the I/O device 402. FIG. 2 depicts a block diagram illustrating an example of the I/O data transfer driver operating unit 103. The I/O data transfer driver operating unit 103 according to the present exemplary embodiment has a transfer control program operating unit 1031, a memory allocation program operating unit 1032, a memory freeing program operating unit 1033 and an I/O data processing program operating unit 1034.

In addition, an example will be described with the present exemplary embodiment where the operating system operating unit 102 and the I/O data transfer driver operating unit 103 are mounted separately. An example of mounting of the units is a method of mounting the I/O data transfer driver operating unit 103 as a device driver. The units are mounted in this way, so that it is possible to contain a change resulting from an addition of a function to the operating system operating unit 102 at a small scale. Further, the I/O data transfer driver operating unit 103 and the operating system operating unit 102 may be integrally mounted. In this case, the devices can be managed as one software, so that development and management become easy.

The transfer control program operating unit 1031 transfers data between the I/O devices by issuing I/O commands to the I/O device 401 and the I/O device 402. The transfer control program operating unit 1031 operates when the CPU 1 reads a transfer control program.

The memory allocation program operating unit 1032 is invoked by the transfer control program operating unit 1031 to allocate the I/O data transfer memory 301 in the main memory 3. The memory allocation program operating unit 1032 operates when the CPU 1 reads the memory allocation program.

The memory freeing program operating unit 1033 is invoked by the transfer control program operating unit 1031 to free the I/O data transfer memory 301. The memory freeing program operating unit 1033 operates when the CPU 1 reads the memory freeing program.

The I/O data processing program operating unit 1034 is invoked by the transfer control program operating unit 1031 to process data to be transferred between the I/O device 401 and the I/O device 402. The I/O data processing program operating unit 1034 operates when the CPU 1 reads the I/O data processing program.

Thus, the I/O data transfer driver operating unit 103 reads the transfer control program, the memory allocation program, the memory freeing program and the I/O data processing program, and operates according to these programs. In this case, the I/O data transfer driver operating unit 103 operates in a kernel mode of the CPU 1. In addition, a program including the transfer control program, the memory allocation program, the memory freeing program and the I/O data processing program will be also referred to as a "data control program".

Hereinafter, the respective operations in the I/O data transfer driver operating unit 103 will be described in detail. The transfer control program operating unit 1031 receives a request from the I/O data transfer application operating unit 101, and transfers data between the I/O device 401 and the I/O device 402.

More specifically, the transfer control program operating unit 1031 invokes the memory allocation program operating unit 1032, and allocates the I/O data transfer memory 301 in the main memory 3. Further, the transfer control program operating unit 1031 refers to the I/O device table memory unit 114, and searches from names of the I/O device 401 and the I/O device 402 addresses of management information of these devices held by the operating system operating unit 102.

Furthermore, the transfer control program operating unit 1031 creates a data read command with respect to the I/O device 401 in the I/O command memory 3011. Still further, the transfer control program operating unit 1031 creates in a DMA list memory 3012 an address list of the data memory 3013 which is a write destination of data to be read (referred to as "read" below) from the I/O device 401. Moreover, the transfer control program operating unit 1031 makes an I/O read request by passing these items of data (more specifically, the data read command and the DMA list) to the I/O device driver operating unit 104. In addition, the transfer control program operating unit 1031 creates a data read command by using the addresses of the management information held by the operating system operating unit 102.

Thus, the transfer control program operating unit 1031 instructs the I/O device driver operating unit 104 to store the data read from the I/O device 401 in the data memory 3013.

Further, if necessary, the transfer control program operating unit 1031 may request the I/O data processing program operating unit 1034 to perform predetermined data processing such as format conversion and compression of data read from the I/O device 401 and stored in the data memory 3013. In addition, format conversion and compression are exemplary predetermined data processing, and data processing requested by the transfer control program operating unit 1031 may be data processing other than format conversion and compression.

Further, the transfer control program operating unit 1031 creates a data write command with respect to the I/O device 402, in the I/O command memory 3011. Furthermore, the transfer control program operating unit 1031 creates in the DMA list memory 3012 an address list of the data memory 3013 which is a write destination of data to be written (referred to as "write" below) in the I/O device 402. Moreover, the transfer control program operating unit 1031 makes an I/O write request by passing these items of data (more specifically, the data write command and the DMA list) to the I/O device driver operating unit 105. In addition, the transfer control program operating unit 1031 creates a data write command by using the addresses of the management information held by the operating system operating unit 102.

Thus, the transfer control program operating unit 1031 instructs the I/O device driver operating unit 105 to write the data stored in the data memory 3013, in the I/O device 402.

Subsequently, the transfer control program operating unit 1031 repeats a series of processing such as processing of reading data from the I/O device 401 and processing of writing data in the I/O device 402 until data transfer of the amount of data requested by the I/O data transfer application operating unit 101 is completed. In addition, between the data read processing and the data write processing, the I/O data processing program operating unit 1034 may perform data processing of data read from the I/O device 401. Thus, by performing data processing such as format conversion and compression between the data read processing and the data write processing (that is, before data is written), it is possible to reduce an entire processing time.

Figure 3:
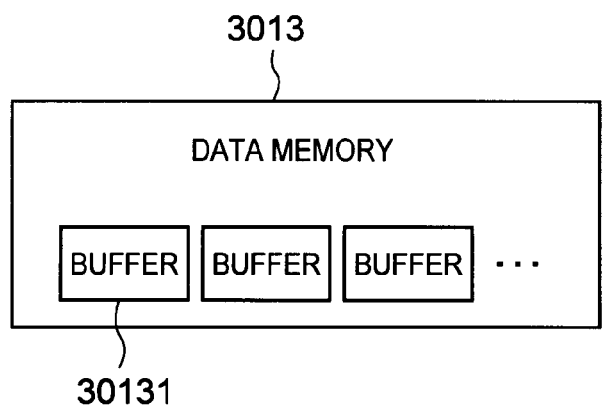
FIG. 3 It depicts an explanatory view illustrating an example of a data memory.

Further, the transfer control program operating unit 1031 may multiplex and make a read request with respect to the I/O device 401 and a write request with respect to the I/O device 402. FIG. 3 depicts an explanatory view illustrating an example of the data memory 3013. In the example illustrated in FIG. 3, the transfer control program operating unit 1031 allocates a plurality of buffers 30131 in the data memory 3013.

By utilizing each buffer 30131, the transfer control program operating unit 1031 performs processing of reading data from the I/O device 401 and processing of writing data in the I/O device 402 in parallel. Further, in this case, the I/O data processing program operating unit 1034 may perform data processing of data read from the I/O device 401 in parallel. Also in this case, the transfer control program operating unit 1031 only needs to repeat the data read processing and the data write processing until the sum of the data transfer amount reaches a data transfer amount requested by the I/O data transfer application operating unit 101.

Figure 4:
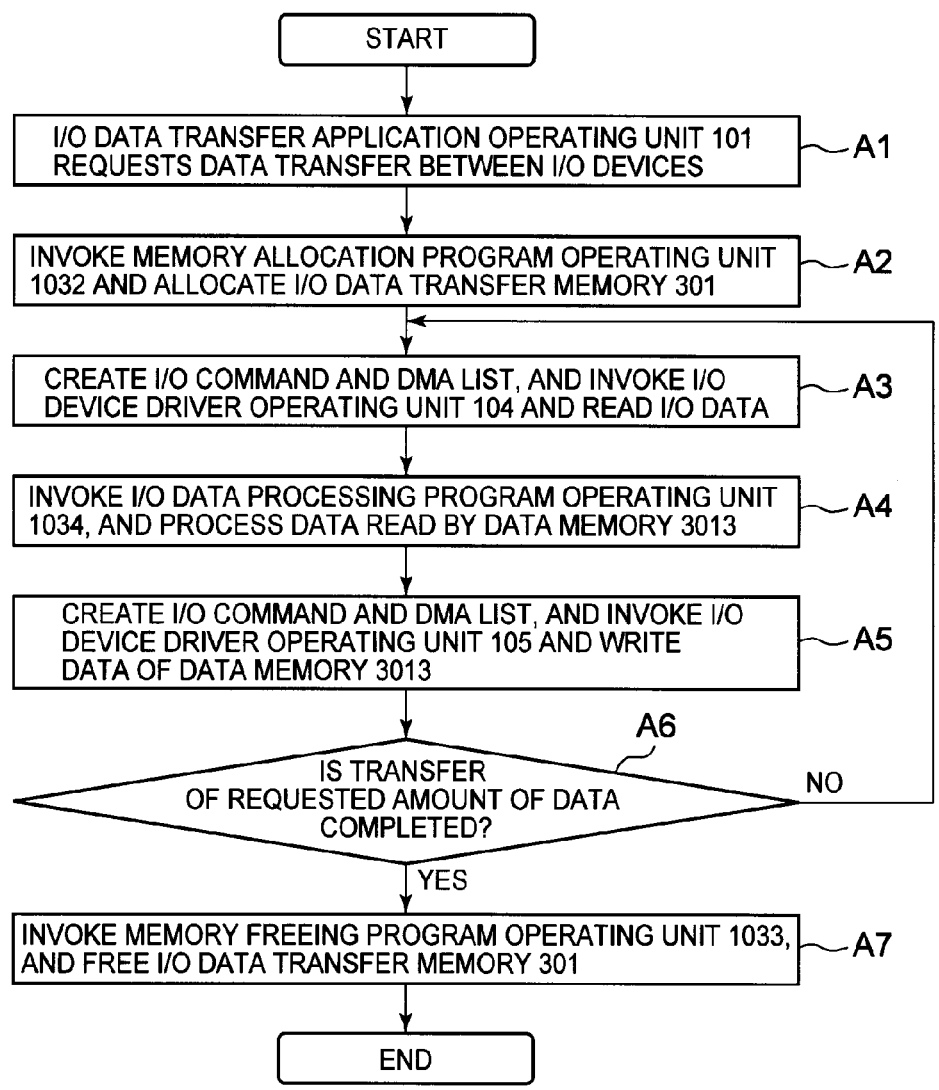
FIG. 4 It depicts a flowchart illustrating an operation example of the data control system according to the first exemplary embodiment.

Next, an operation of the data control system according to the present exemplary embodiment will be described. First, an operation when a read request with respect to the I/O device 401 and a write request with respect to the I/O device 402 are made without being multiplexed will be described. FIG. 4 depicts a flowchart illustrating an operation example of the data control system according to the present exemplary embodiment. First, the I/O data transfer application operating unit 101 requests the data transfer driver operating unit 103 to transfer data between I/O devices (step A1).

The transfer control program operating unit 1031 of the I/O data transfer driver operating unit 103 receives a data transfer request and invokes the memory allocation program operating unit 1032, and the memory allocation program operating unit 1032 allocates the I/O data transfer memory 301 in the main memory 3 (step A2).

Subsequently, the transfer control program operating unit 1031 creates an I/O command in the I/O command memory 3011, and a DMA list in the DMA list memory 3012. Further, the transfer control program operating unit 1031 makes an I/O read request by passing these items of data (that is, the I/O read command and the DMA list) to the I/O device driver operating unit 104, reads I/O data from the I/O device 401 and stores the read data in the data memory 3013 (step A3).

Subsequently, if necessary, the transfer control program operating unit 1031 invokes the I/O data processing program operating unit 1034, and performs data processing such as format conversion and compression of the data stored in the data memory 3013 (step A4).

Subsequently, the transfer control program operating unit 1031 creates an I/O command in the I/O command memory 3011, and a DMA list in the DMA list memory 3012. Further, the transfer control program operating unit 1031 makes an I/O write request by passing these items of data to the I/O device driver operating unit 105, and writes the data stored in the data memory 3013 in the I/O device 402 (step A5).

Then, the transfer control program operating unit 1031 decides whether or not transfer of data of a requested amount is completed (step A6). When transfer of the data of the requested amount is not completed (No in step A6), the I/O data transfer driver operating unit 103 repeats processing in step A3 to step A5. Meanwhile, when transfer of the data of the requested amount is completed (Yes in step A6), the transfer control program operating unit 1031 invokes the memory freeing program operating unit 1033, and the memory freeing program operating unit 1033 frees the I/O data transfer memory 301 (step A7). Thus, the I/O data transfer driver operating unit 103 repeats processing in steps A3 to A5 until transfer processing of data of the amount requested by the I/O data transfer application operating unit 101 is completed.

Figure 5:
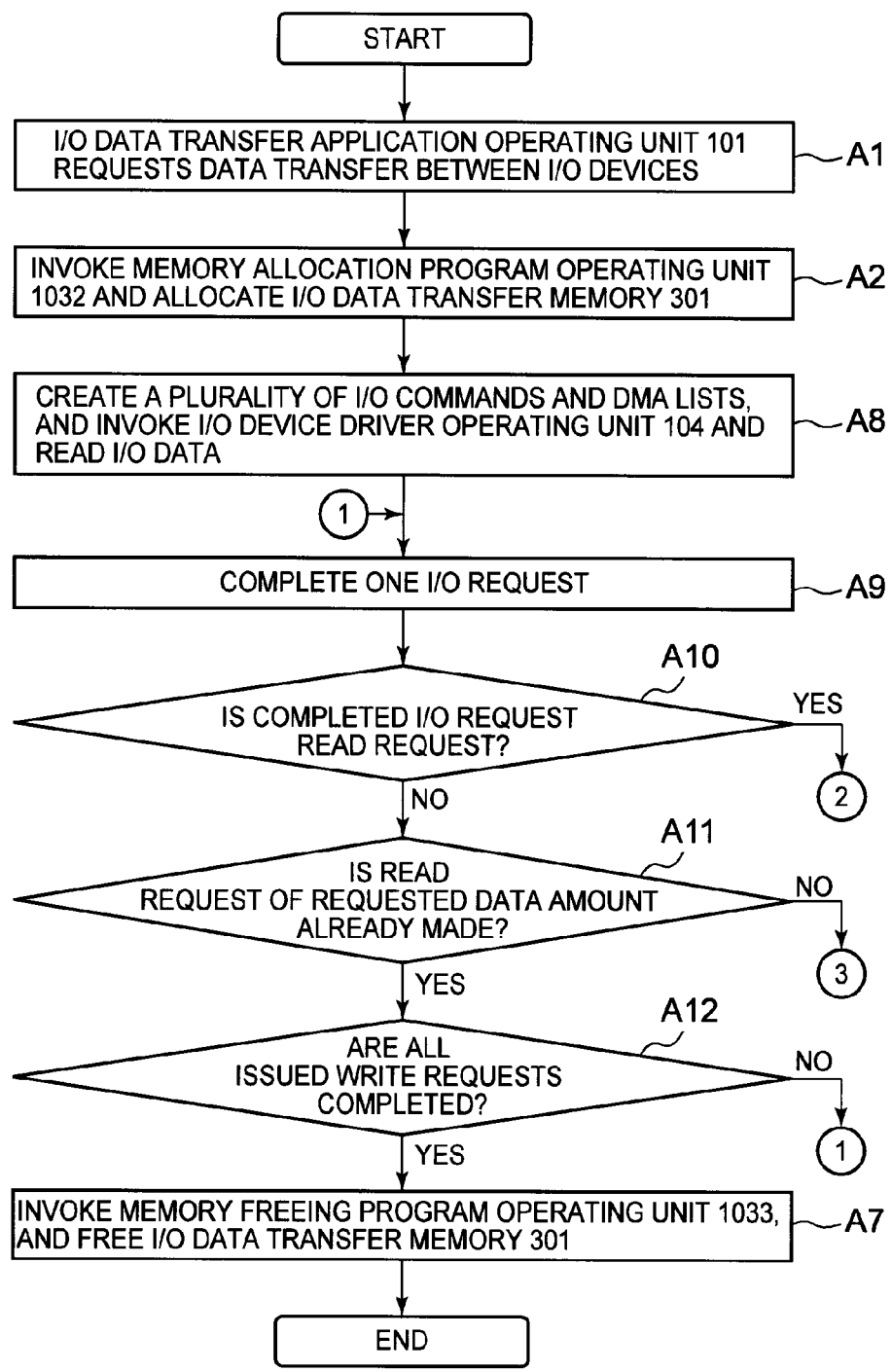
FIG. 5 It depicts a flowchart illustrating another operation example of the data control system according to the first exemplary embodiment.
Figure 6:
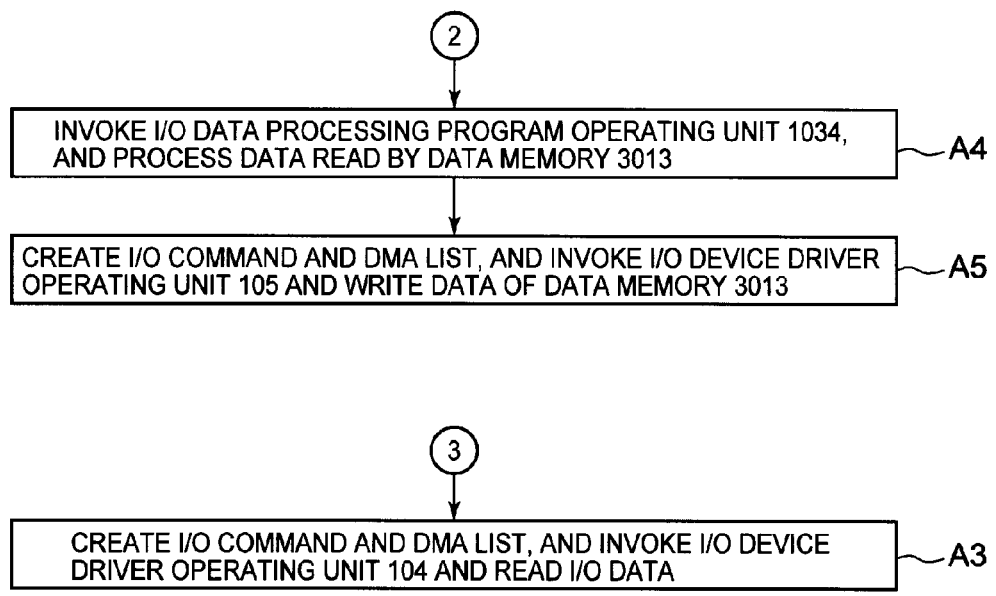
FIG. 6 It depicts a flowchart illustrating part of another operation example of the data control system according to the first exemplary embodiment.

Next, an operation when a read request with respect to the I/O device 401 and a write request with respect to the I/O device 402 are multiplexed and made will be described. FIGS. 5 and 6 depict flowcharts illustrating other operation examples of the data control system according to the present exemplary embodiment. The processing in step A1 and step A2 in which the I/O data transfer application operating unit 101 requests the I/O data transfer driver operating unit 103 to transfer data between the I/O devices, and the memory allocation program operating unit 1032 allocates the data transfer memory 301 is the same as the processing illustrated in FIG. 4.

The transfer control program operating unit 1031 creates in the I/O command memory 3011 a plurality of I/O read commands for writing data in a plurality of buffers 30131 in the data memory 3013. In addition, the transfer control program operating unit 1031 creates in the DMA list memory 3012 DMA lists corresponding to respective I/O read commands. Further, the transfer control program operating unit 1031 requests the I/O device driver operating unit 104 to read a plurality of items of I/O data using these items of data (that is, the I/O read commands and the DMA lists) (step A8 in FIG. 5).

Subsequently, the transfer control program operating unit 1031 stands by until the issued request to the I/O device is completed. When one I/O request is completed (step A9), the transfer control program operating unit 1031 decides whether or not the completed I/O request is a read request (step A10). When the completed I/O request is a read request (Yes in step A10), the transfer control program operating unit 1031 performs the processing in step A4 and step A5 with respect to the data read from the I/O device 401 and stored on the buffer of the data memory 301 similar to the operation when I/O requests are not multiplexed. Subsequently, the transfer control program operating unit 1031 stands by until an I/O request is completed again.

Next, a case that the completed I/O request is not a read request (that is, a write request) in step A10 will be described. When the completed I/O request is a write request in step A10 (No in step A10), the transfer control program operating unit 1031 decides whether or not the amount of data read in response to the read request made with respect to the I/O device 401 reaches the amount of data requested from the I/O data transfer application operating unit 101 (step A11).

When the data amount does not reach the requested data amount (No in step A11), the transfer control program operating unit 1031 performs the same processing as that in step A3 of making an I/O read request to the I/O device driver operating unit 104, and storing the read data in the data memory 3013. Subsequently, the transfer control program operating unit 1031 stands by until an I/O request is completed again.

Meanwhile, when the data amount reaches the requested data amount in step A11 (Yes in step A11), the transfer control program operating unit 1031 decides whether or not all write requests issued to the I/O device driver operating unit 105 are completed (step A12). When all write requests are not completed (No in step A12), the transfer control program operating unit 1031 stands by until an I/O request is completed again. Meanwhile, when all write requests are completed (Yes in step A12), the memory freeing program operating unit 1033 frees the I/O data transfer memory 301 (step A7).

In the present exemplary embodiment, PCI express buses are illustrated as buses which connect the bridge 2 and the I/O device 401, and the bridge 2 and the I/O device 402. In addition, the bridge 2 and the I/O devices 401 and 402 may be connected using other buses such as PCI buses or PCI-X buses. Similarly, a standard of buses which the I/O device 401 and the I/O device 402 comply with may be PCI or PCI-X.

Further, a case has been described with the present exemplary embodiment where the I/O device 401 which reads data and the I/O device 402 which writes data are different I/O devices. However, the I/O device 401 and the I/O device 402 may be a single I/O device. In this case, data transfer between two devices may be performed between different modules of a single I/O device or between different addresses of a single module of a single I/O device.

As described above, according to the present exemplary embodiment, the I/O data transfer driver operating unit 103 (more specifically, the transfer control program operating unit 1031) which controls data transfer from the I/O device 401 to the I/O device 402 in the kernel mode instructs the I/O device driver operating unit 104 to store the data read from the I/O device 401 in the data memory 3013. Further, the I/O data transfer driver operating unit 103 (more specifically, the transfer control program operating unit 1031) instructs the I/O device driver operating unit 105 to write the data stored in the data memory 3013, in the I/O device 402.

That is, in the data control system according to the present exemplary embodiment, the I/O data transfer driver operating unit 103 operates in the kernel mode of the CPU, and writes data read from the first I/O device 401 through the I/O device driver operating unit 104, in the second I/O device 402 through the I/O device driver operating unit 105. Consequently, it is possible to transfer data at a high speed between two I/O devices which do not support an operation of directly transferring data between I/O devices.

Further, when data processing is performed in a user mode as in a general computer system, if processing such as copy of data or context switch is performed, an overhead occurs. However, in the present exemplary embodiment, data processing is performed in the kernel mode, so that it is possible to transfer data at a high speed.

Further, the data control system according to the present exemplary embodiment performs predetermined data processing such as format conversion and compression of data read from the I/O device 401, and writes data in the second I/O device 402. Consequently, data is transferred between two I/O devices which do not have functions of processing transfer data while performing various types of processing of data to be transferred, so that it is possible to reduce an entire processing time.

Further, a read request with respect to the first I/O device 401 and a write request with respect to the second I/O device 402 may be multiplexed and made. According to this configuration, compared to data transfer performed without multiplexing I/O requests, it is possible to transfer data at a higher speed between two I/O devices which do not support an operation of directly transferring data.

Second Exemplary Embodiment

Figure 7:
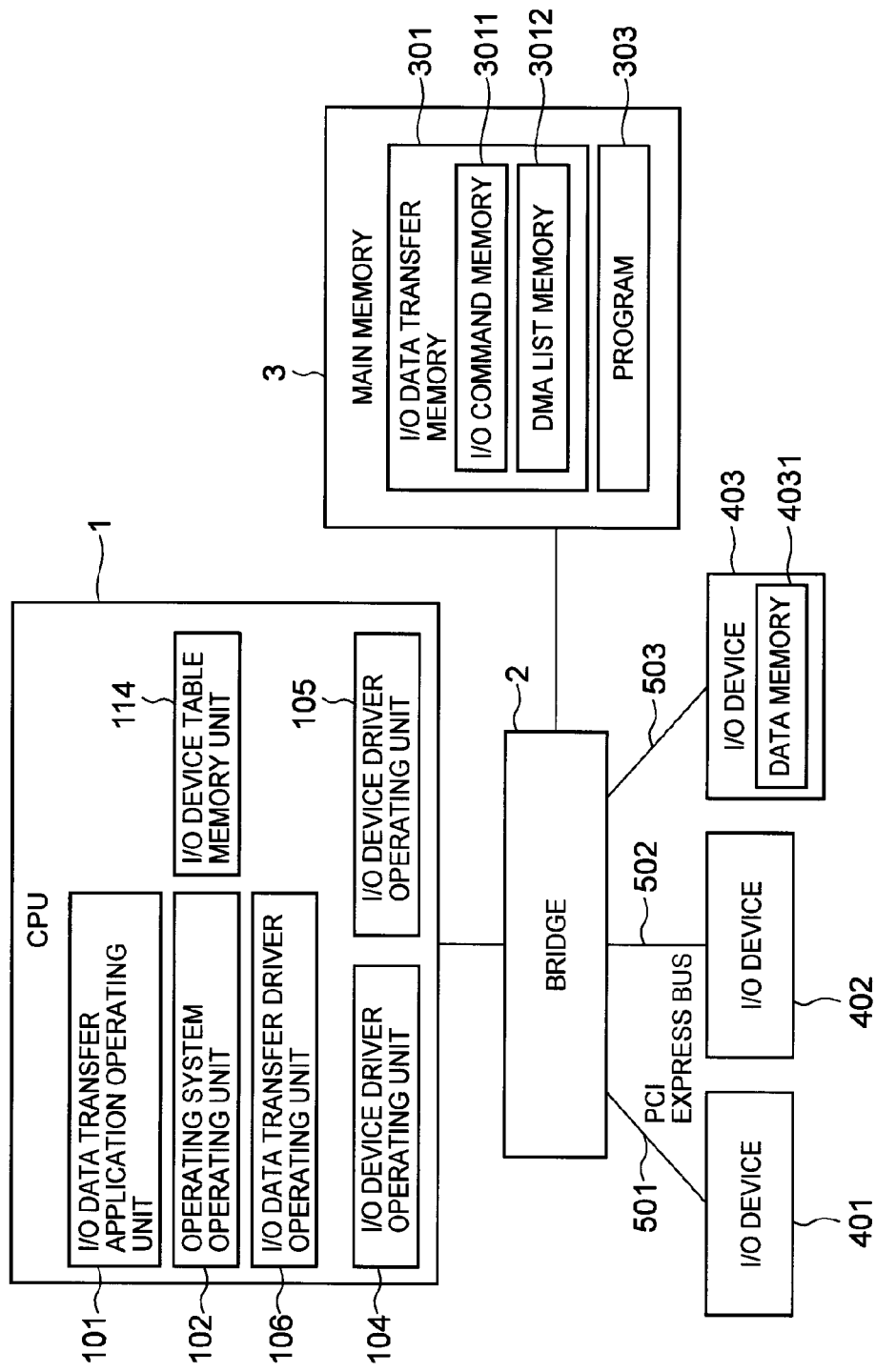
FIG. 7 It depicts a block diagram illustrating an example of a data control system according to a second exemplary embodiment of the present invention.

FIG. 7 depicts a block diagram illustrating an example of a data control system according to a second exemplary embodiment of the present invention. In addition, the same configurations as those in the first exemplary embodiment will be assigned the same reference numerals as those in FIG. 1, and will not be described. The data control system according to the present exemplary embodiment has a CPU 1, a main memory 3, an I/O device 401 which is a first I/O device, an I/O device 402 which is a second I/O device, an I/O device 403 and a bridge 2 which connects these I/O devices. That is, the data control system according to the second exemplary embodiment differs from a data control system according to the first exemplary embodiment in having the I/O device 403.

The main memory 3 has an I/O data transfer memory 301. Further, the I/O data transfer memory 301 has an I/O command memory 3011 and a DMA list memory 3012. Furthermore, the I/O device 403 has a data memory 4031. The data memory 4031 is mapped on a physical address of a computer, and is used as a data buffer for purposes of reading and writing data from and in the CPU 1. That is, the data memory 4031 corresponds to a data memory 3013 according to the first exemplary embodiment.

The CPU 1 has an I/O data transfer application operating unit 101, an operating system operating unit 102, an I/O data transfer driver operating unit 106, an I/O device driver operating unit 104, an I/O device driver operating unit 105 and an I/O device table memory unit 114.

Further, the main memory 3 stores a program 303. The program 303 is read by the CPU 1, and operates as the I/O data transfer application operating unit 101, the operating system operating unit 102, the I/O data transfer driver operating unit 106, the I/O device driver operating unit 104 which controls the I/O device 401, and the I/O device driver operating unit 105 which controls the I/O device 402.

The I/O transfer driver operating unit 106 executes the same operation as that of an I/O transfer driver operating unit 103 according to the first exemplary embodiment. Meanwhile, the I/O transfer driver operating unit 106 differs from the I/O transfer driver operating unit 103 according to the first exemplary embodiment in using the data memory 4031 as a data buffer for I/O data transfer.

Figure 8:
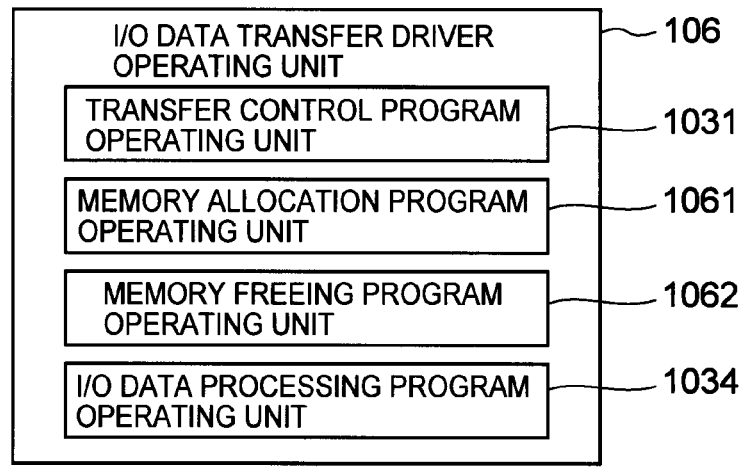
FIG. 8 It depicts a block diagram illustrating an example of an I/O data transfer driver operating unit.

FIG. 8 depicts a block diagram illustrating an example of the I/O data transfer driver operating unit 106. The I/O data transfer driver operating unit 106 according to the present exemplary embodiment has a transfer control program operating unit 1031, a memory allocation program operating unit 1061, a memory freeing program operating unit 1062 and an I/O data processing program operating unit 1034.

The memory allocation program operating unit 1061 is invoked by the transfer control program operating unit 1031 to allocate a transfer memory area in the data memory 4031. Further, the memory freeing program operating unit 1062 is invoked by the transfer control program operating unit 1031 to free a transfer memory area in the data memory 4031. In addition, the memory allocation program operating unit 1061 operates when the CPU 1 reads the memory allocation program. Further, the memory freeing program operating unit 1062 operates when the CPU 1 reads the memory freeing program.

The other configurations and operations are the same as those in the first exemplary embodiment.

As described above, in the data control system according to the present exemplary embodiment, the I/O transfer driver operating unit 106 uses a memory area (that is, the data memory 4031) held by a third I/O device as a data buffer which mediates I/O data transfer. By this means, it is not necessary to use the main memory 3 as a data buffer upon data transfer between two I/O devices, so that it is possible to reduce consumption of main memory resources and main memory bus resources in addition to an effect according to the first exemplary embodiment.

Third Exemplary Embodiment

Next, a third exemplary embodiment will be described. In a data control system according to the third exemplary embodiment, I/O devices between which data is transferred in the first exemplary embodiment are storage devices. Meanwhile, a storage device is a data storage device which complies with a storage standard such as SCSI, SAS (Serial Attached SCSI) or SATA. In the present exemplary embodiment, data transfer which is performed upon storage copy will be described in detail.

Figure 9:
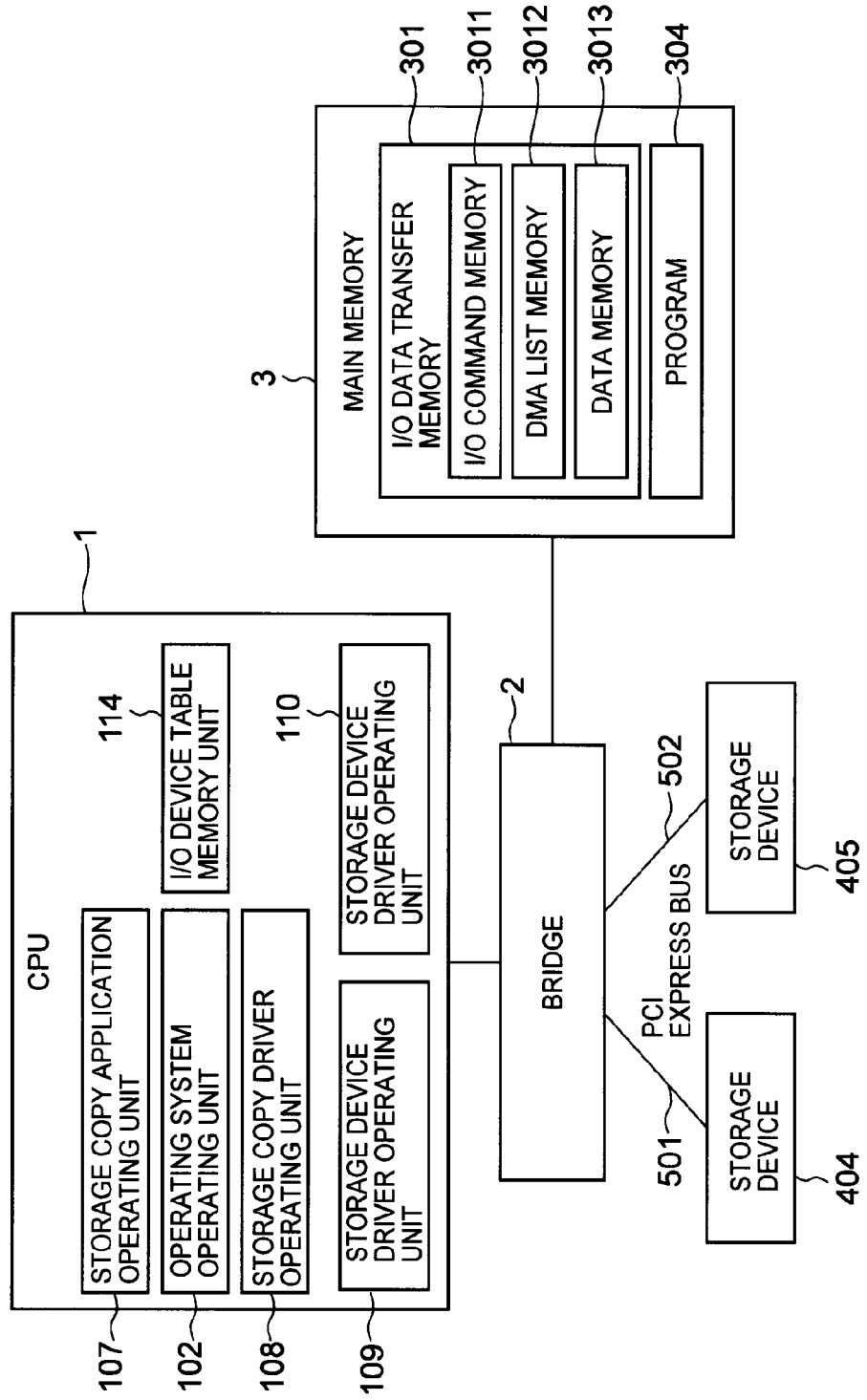
FIG. 9 It depicts a block diagram illustrating an example of a data control system according to a third exemplary embodiment of the present invention.

FIG. 9 depicts a block diagram illustrating an example of the data control system according to the third exemplary embodiment of the present invention. In addition, the same configurations as those in the first exemplary embodiment will be assigned the same reference numerals as those in FIG. 1, and will not be described. The data control system according to the present exemplary embodiment has a CPU 1, a main memory 3, a storage device 404 which is a first storage device, a storage device 405 which is a second storage device and a bridge 2 which connects these storage devices.

The CPU 1 has a storage copy application operating unit 107, an operating system operating unit 102, a storage copy driver operating unit 108, a storage device driver operating unit 109, a storage device driver operating unit 110 and an I/O device table memory unit 114.

That is, the storage copy application operating unit 107, the storage copy driver operating unit 108, the storage device driver operating unit 109, the storage device driver operating unit 110, the storage device 404 and the storage device 405 according to the third exemplary embodiment correspond to an I/O data transfer application operating unit 101, an I/O data transfer driver operating unit 103, an I/O device driver operating unit 104, an I/O device driver operating unit 105, an I/O device 401 and an I/O device 402 according to the first exemplary embodiment, respectively.

The main memory 3 has an I/O data transfer memory 301. In addition, detail of the I/O data transfer memory 301 is the same as that in the first exemplary embodiment. Further, the main memory 3 stores a program 304. The program 304 corresponds to a program 302 according to the first exemplary embodiment. The program 304 is read by the CPU 1, and operates as the storage copy application operating unit 107, the operating system operating unit 102, the storage copy driver operating unit 108, the storage device driver operating unit 109 and the storage device driver operating unit 110.

Figure 10:
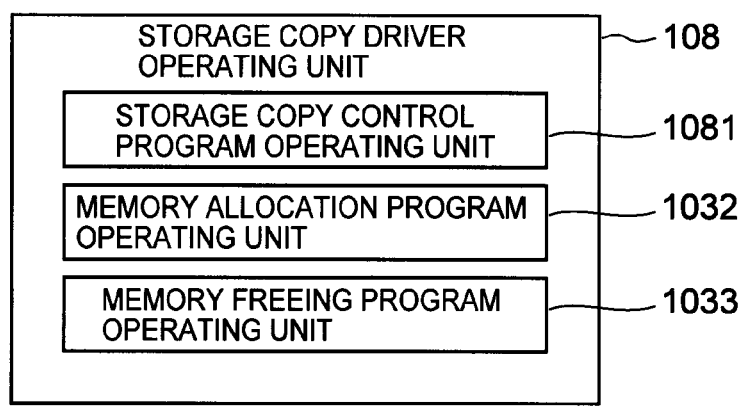
FIG. 10 It depicts a block diagram illustrating an example of a storage copy driver operating unit.

The storage copy driver operating unit 108 performs copy control from the storage device 404 to the storage device 405. FIG. 10 depicts a block diagram illustrating an example of the storage copy driver operating unit 108. The storage copy driver operating unit 108 according to the present exemplary embodiment has a storage copy control program operating unit 1081, a memory allocation program operating unit 1032 and a memory freeing program operating unit 1033.

The storage copy control program operating unit 1081 copies data between storage devices by issuing I/O commands to the storage device 404 and the storage device 405. The storage copy control program operating unit 1081 operates when the CPU 1 reads a storage copy control program.

In addition, the memory allocation program operating unit 1032 and the memory freeing program operating unit 1033 are the same as those in the first exemplary embodiment.

Thus, the storage copy driver operating unit 108 reads the storage copy control program, the memory allocation program and the memory freeing program, and operates according to these programs. In this case, the storage copy driver operating unit 108 operates in a kernel mode of the CPU 1.

Hereinafter, the respective operating units of the storage copy driver operating unit 108 will be described in detail. The storage copy control program operating unit 1081 receives a request from the storage copy application operating unit 107, and copies data between the storage device 404 and the storage device 405.

More specifically, the storage copy control program operating unit 1081 invokes the memory allocation program operating unit 1032, and allocates an I/O data transfer memory 301 in the main memory 3. Further, the storage copy control program operating unit 1081 refers to the I/O device table memory unit 114, and searches from names of the storage device 404 and the storage device 405 addresses of management information of these devices held by the operating system operating unit 102.

Furthermore, the storage copy control program operating unit 1081 creates a data read command with respect to the storage device 404 in the I/O command memory 3011. Still further, the storage copy control program operating unit 1081 creates in a DMA list memory 3012 an address list of the data memory 3013 which is a write destination of data read from the storage device 404. Moreover, the storage copy control program operating unit 1081 makes an I/O read request by passing these items of data (more specifically, the data read command and the DMA list) to the storage device driver operating unit 109. In addition, the storage copy control program operating unit 1081 creates a data read command by using the addresses of the management information held by the operating system operating unit 102.

Further, the storage copy control program operating unit 1081 creates a data write command with respect to the storage device 405 in the I/O command memory 3011. Furthermore, the storage copy control program operating unit 1081 creates in the DMA list memory 3012 an address list of the data memory 3013 which is a write destination of data to be written in the storage device 405. Still further, the storage copy control program operating unit 1081 makes an I/O write request bypassing these items of data (more specifically, the data write command and the DMA list) to the storage device driver operating unit 110. In addition, the storage copy control program operating unit 1081 creates a data write command by using the addresses of the management information held by the operating system operating unit 102.

Subsequently, the storage copy control program operating unit 1081 repeats a series of processing such as processing of reading data from the storage device 404 and processing of writing data in the storage device 405 until transfer of the amount of data requested by the storage copy application operating unit 107 is completed.

Further, the storage copy control program operating unit 1081 may multiplex and make a read request with respect to the storage device 404 and a write request with respect to the storage device 405. In this case, as illustrated in FIG. 3, a plurality of buffers 30131 may be allocated in the data memory 3013.

More specifically, the storage copy control program operating unit 1081 performs the processing of reading data from the storage device 404 and the processing of writing data in the storage device 405 in parallel by utilizing each buffer 30131. Further, the storage copy control program operating unit 1081 repeats the data read processing and the data write processing until the sum of the data transfer amount reaches a data transfer amount requested by the storage copy application operating unit 107.

Figure 11:
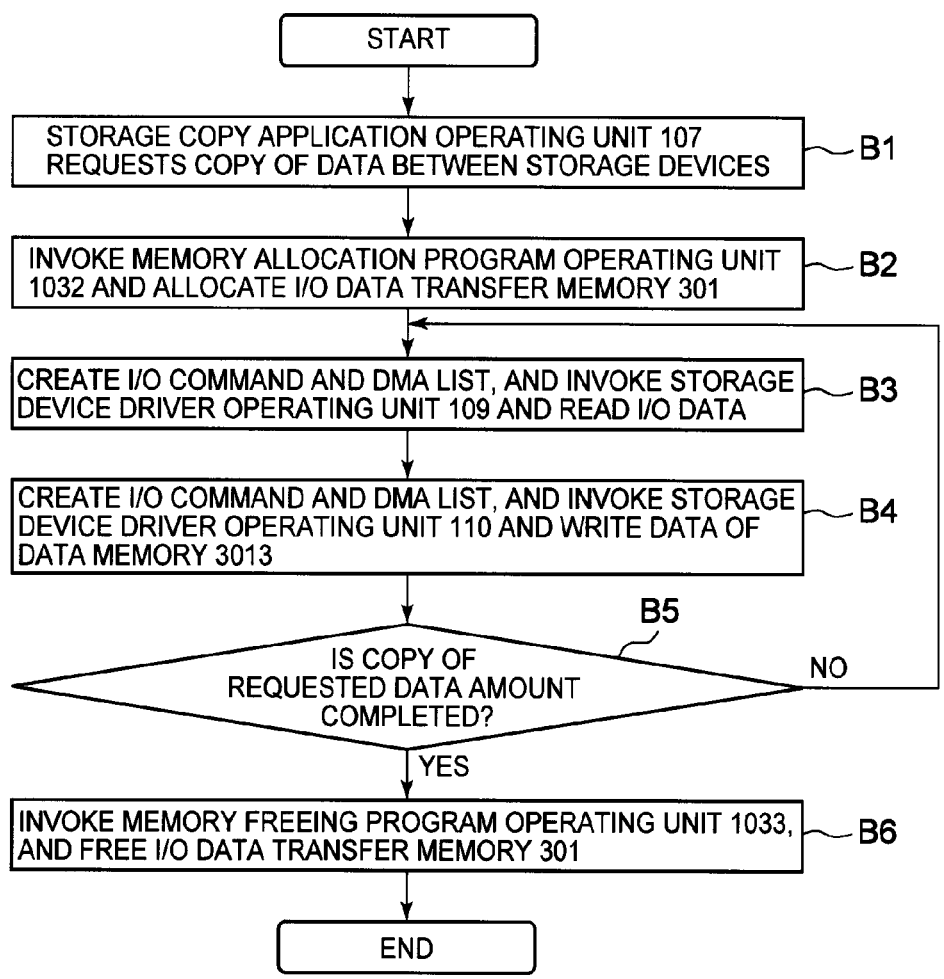
FIG. 11 It depicts a flowchart illustrating an operation example of the data control system according to the third exemplary embodiment.

Next, an operation of the data control system according to the present exemplary embodiment will be described. First, an operation when a read request with respect to the storage device 404 and a write request with respect to the storage device 405 are made without being multiplexed will be described. FIG. 11 depicts a flowchart illustrating an operation example of the data control system according to the present exemplary embodiment. First, the storage copy application operating unit 107 requests the storage copy driver operating unit 108 to copy data between storage devices (step B1).

The storage copy control program operating unit 1081 of the storage copy driver operating unit 108 receives a data copy request and invokes the memory allocation program operating unit 1032, and the memory allocation program operating unit 1032 allocates the I/O data transfer memory 301 in the main memory 3 (step B2).

Subsequently, the storage copy control program operating unit 1081 creates an I/O command in the I/O command memory 3011, and a DMA list in the DMA list memory 3012. Further, the storage copy control program operating unit 1081 makes an I/O read request by passing these items of data (that is, the I/O read command and the DMA list) to the storage device driver operating unit 109, reads I/O data from the storage device 404 and stores the read data in the data memory 3013 (step B3).

Subsequently, the storage copy control program operating unit 1081 creates an I/O command in the I/O command memory 3011, and a DMA list in the DMA list memory 3012. Further, the storage copy control program operating unit 1081 makes an I/O write request by passing these items of data to the storage device driver operating unit 110, and writes the data stored in the data memory 3013, in the storage device 405 (step B4).

Subsequently, the storage copy control program operating unit 1081 decides whether or not copy processing of the requested data amount is completed (step B5). When copy processing of the requested data amount is not completed (No in step B5), the storage copy control program operating unit 1081 repeats processing in step B3 and step B4. Meanwhile, when the copy processing of the requested data amount is completed (Yes in step B5), the storage copy control program operating unit 1081 invokes the memory freeing program operating unit 1033, and the memory freeing program operating unit 1033 frees the I/O data transfer memory 301 (step B6). Thus, the storage copy control program operating unit 1081 repeats the processing in steps B3 and B4 until the copy processing of the data amount requested by the storage copy application operating unit 107 is completed.

Figure 12:
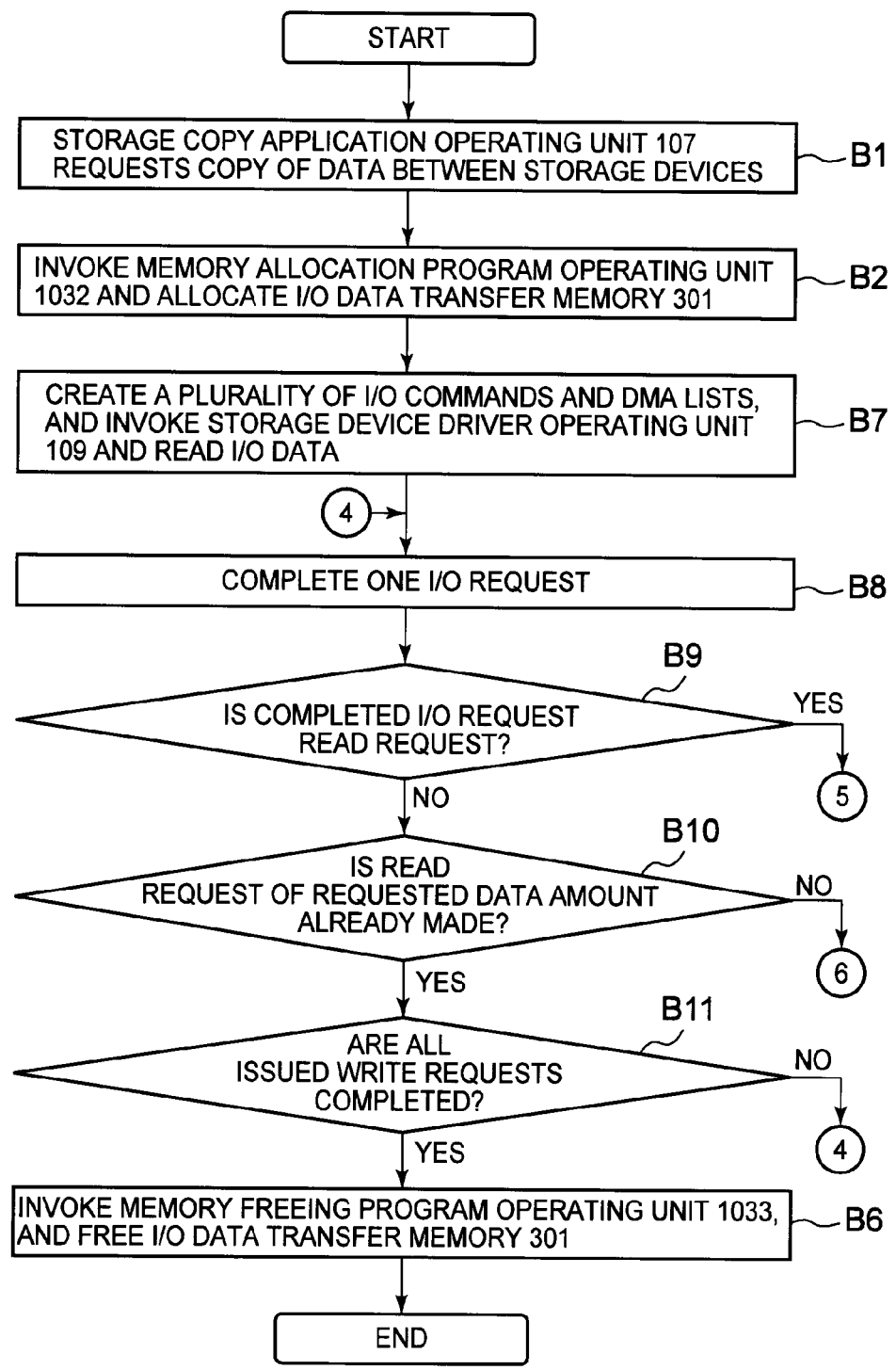
FIG. 12 It depicts a flowchart illustrating another operation example of the data control system according to the third exemplary embodiment.
Figure 13:
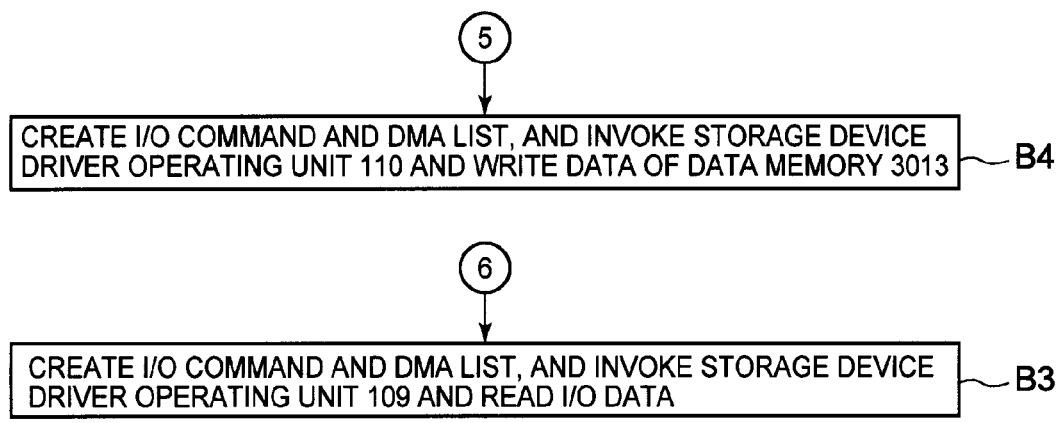
FIG. 13 It depicts a flowchart illustrating part of another operation example of the data control system according to the third exemplary embodiment.

Next, an operation when a read request with respect to the storage device 404 and a write request with respect to the storage device 405 are multiplexed and made will be described. FIGS. 12 and 13 depict flowcharts illustrating other operation examples of the data control system according to the present exemplary embodiment. The processing in step B1 and step B2 in which the storage copy application operating unit 107 requests the storage copy driver operating unit 108 to copy data between storage devices, and the memory allocation program operating unit 1032 allocates the I/O data transfer memory 301 is the same as the processing illustrated in FIG. 11.

The storage copy control program operating unit 1081 creates in the I/O command memory 3011 a plurality of I/O read commands for writing data in a plurality of buffers 30131 in the data memory 3013. In addition, the storage copy control program operating unit 1081 creates in the DMA list memory 3012 DMA lists corresponding to respective I/O read commands. Further, the storage copy control program operating unit 1081 requests the storage device driver operating unit 109 to read a plurality of items of I/O data by using these items of data (that is, the I/O read commands and the DMA lists) (step B7).

Subsequently, the storage copy control program operating unit 1081 stands by until a request to an issued storage device is completed. When one I/O request is completed (step B8), the storage copy control program operating unit 1081 decides whether or not the completed I/O request is a read request (step B9). When the completed I/O request is a read request (Yes in step B9), the storage copy control program operating unit 1081 performs processing in step B4 (that is, writes data in the storage device 405) with respect to data read from the storage device 404 and stored in the buffer on the data memory 301 similar to the operation when I/O requests are not multiplexed. Subsequently, the storage copy control program operating unit 1081 stands by until an I/O request is completed again.

Next, a case that the completed I/O request is not a read request (that is, a write request) in step B9 will be described. When the completed I/O request is a write request in step B9 (No in step B9), the storage copy control program operating unit 1081 decides whether or not the amount of data read in response to the read request made with respect to the storage device 404 reaches the data amount requested by the storage copy application operating unit 107 (step B10).

When the data amount does not reach the requested data amount (No in step B10), the storage copy control program operating unit 1081 performs the same processing as that in step B3 of making an I/O read request to the storage device driver operating unit 109, and storing the read data in the data memory 3013. Subsequently, the storage copy control program operating unit 1081 stands by until an I/O request is completed again.

Meanwhile, when the data amount reaches the requested data amount in step B10 (Yes in step B10), the storage copy control program operating unit 1081 decides whether or not all write requests issued to the storage device driver operating unit 110 are completed (step B11). When all write requests are not completed (No in step B11), the storage copy control program operating unit 1081 stands by until an I/O request is completed again. Meanwhile, when all write requests are completed (Yes in step B11), the memory freeing program operating unit 1033 frees the I/O data transfer memory 301 (step B6).

In addition, similar to the first exemplary embodiment, the storage copy control program operating unit 1081 may perform predetermined data processing such as format conversion and compression while data is copied.

As described above, according to the present exemplary embodiment, the storage copy driver operating unit 108 (more specifically, the storage copy control program operating unit 1081) which copies data from the storage device 404 to the storage device 405 in the kernel mode instructs the storage device driver operating unit 109 to store the data read from the storage device 404, in the data memory 3013. Further, the storage copy driver operating unit 108 (more specifically, the storage copy control program operating unit 1081) instructs the storage device driver operating unit 110 to write the data stored in the data memory 3013 in the storage device

405. Consequently, it is possible to copy data at a high speed between two storage devices which do not support an operation of directly copying data.

Figure 14:
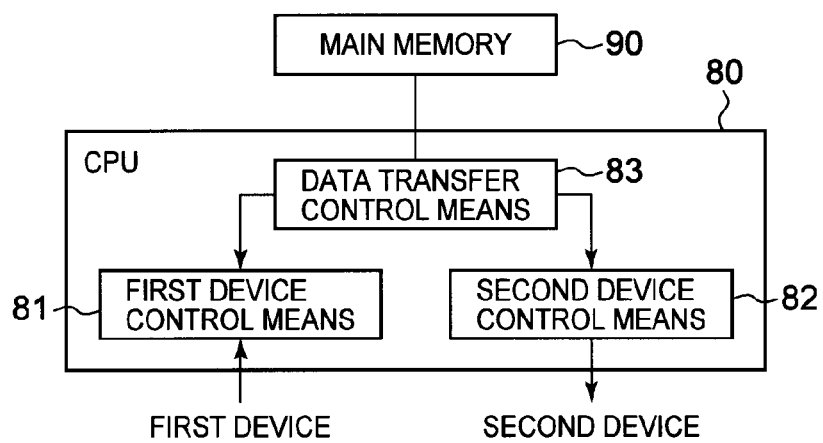
FIG. 14 It depicts a block diagram illustrating an example of a minimum configuration of a data control system according to the present invention.
Figure 15:
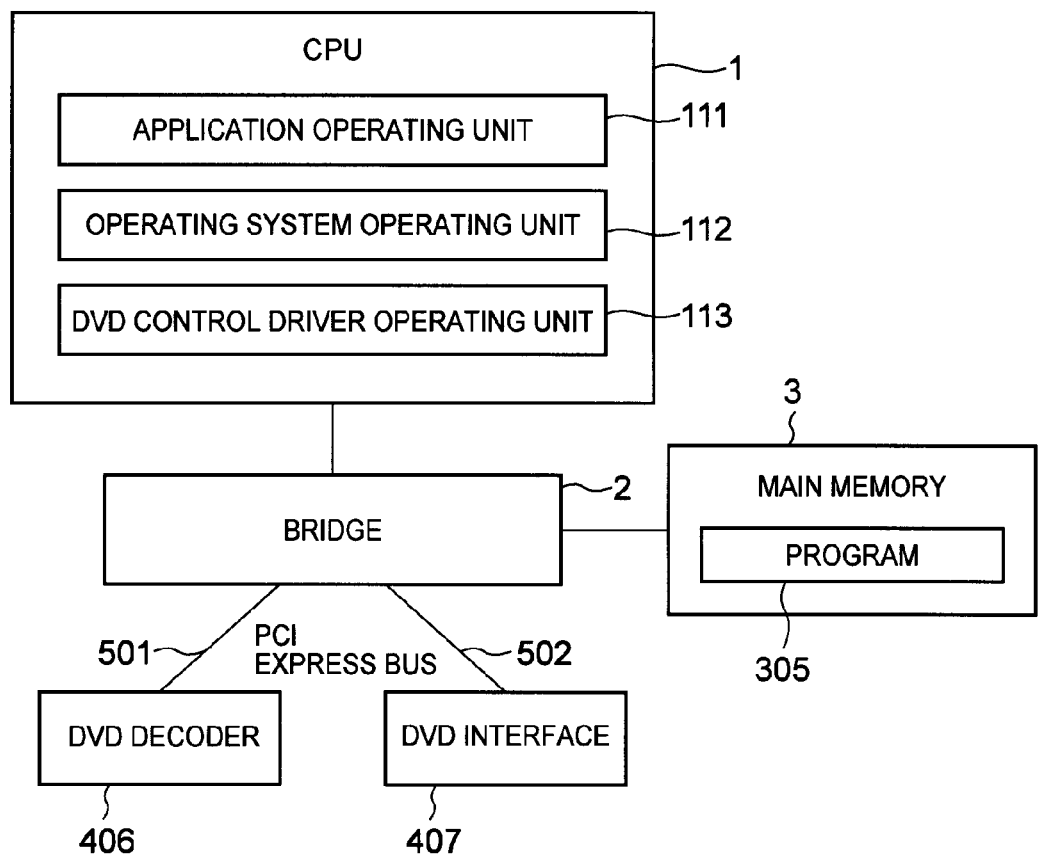
FIG. 15 It depicts an explanatory view illustrating an example of a common data transfer system.

Next, an example of a minimum configuration of the present invention will be described. FIG. 14 depicts a block diagram illustrating an example of a minimum configuration of a data control system according to the present invention. A data control system according to the present invention has: a CPU 80 (for example, a CPU 1) which controls data transfer from a first device (for example, an I/O device 401) to a second device (for example, an I/O device 402) in a kernel mode; and a main memory 90 (for example, a main memory 3) which stores data to be transferred from the first device to the second device.

The CPU 80 has: a first device control means 81 (for example, an I/O device driver operating unit 104) which controls the first device; a second device control means (for example, an I/O device driver operating unit 105) which controls the second device; and a data transfer control means 83 (for example, an I/O data transfer driver operating unit 103) which makes a read instruction which instructs the first device control means 81 to store data read from the first device in the main memory 3, and makes a write instruction which instructs the second device control means 82 to write the data stored in the main memory 3 in the second device.

According to this configuration, it is possible to transfer data at a high speed between two I/O devices which do not support an operation of direct data transfer.

Part or the entirety of the above exemplary embodiments can be described as in the following notes and, however, is by no means limited to the following notes.

(Supplementary note 1) A data control system has:
a CPU which controls data transfer from a first device to a second device in a kernel mode; and a main memory which stores data to be transferred from the first device to the second device, and the CPU has: a first device control means which controls the first device; a second device control means which controls the second device; and a data transfer control means which makes a read instruction which instructs the first device control means to store data read from the first device in the main memory, and makes a write instruction which instructs the second device control means to write the data stored in the main memory, in the second device.

(Supplementary note 2) In the data control system described in Supplementary note 1, the data transfer control means performs predetermined processing with respect to the data stored in the main memory before making the write instruction to the second device.

(Supplementary note 3) In the data control system described in Supplementary note 1 or 2, when the first device makes a data transfer request to the second device, the data transfer control means repeats the read instruction to the first device control means and the write instruction to the second device until transfer of a requested data amount is completed.

(Supplementary note 4) The data control system described in anyone of Supplementary notes 1 to 3 has: an area allocating means which allocates in the main memory an area in which data to be transferred is stored; and an area freeing means which frees the area.

(Supplementary note 5) In the data control system described in any one of Supplementary notes 1 to 4, the main memory has: an instruction command memory means which stores a read instruction command which indicates the read instruction and a write instruction command which indicates a write instruction; and a storage destination list memory means which stores a storage destination list which is a list which indicates a storage destination of transfer data in the main memory, and the data transfer control means creates the read instruction command and the write instruction command and stores the read instruction command and the write instruction command in the instruction command memory means, and creates the storage destination list and stores the storage destination list in the storage destination list memory means, the first device control means stores the data read from the first device in the storage destination indicated by the storage destination list, based on the read instruction command stored in the instruction command memory means and the storage destination list, and the second device control means writes the data read from the storage destination indicated by the storage destination list, in the second device based on the write instruction command stored in the instruction command memory means and the storage destination list.

(Supplementary note 6) The data control system described in Supplementary note 5, further has a management information address memory means which stores management information addresses which are addresses which indicate positions at which management information of the first device and the second device is stored, in association with names of the first device and the second device, and the data transfer control means creates a read instruction command and a write instruction command based on the management information stored at the positions indicated by the management information addresses.

(Supplementary note 7) In the data control system described in any one of Supplementary notes 1 to 6, the main memory has a plurality of buffers which stores transfer data, and the data transfer control means makes the read instruction to the first device control means per buffer in parallel, and makes the write instruction to the second device control means per buffer in parallel.

(Supplementary note 8) In the data control system described in any one of Supplementary notes 1 to 7, the CPU controls data copy from a first storage device to a second storage device in the kernel mode, the main memory stores data to be copied from the first storage device to the second storage device; the first device control means controls the first storage device, and the second device control means controls the second storage device.

(Supplementary note 9) The data control system described in anyone of Supplementary notes 1 to 8 has a third device which stores data to be transferred from the first device to the second device, and a data transfer control means makes a read instruction which instructs the first device control means to store data read from the first device in the third device, and makes a write instruction which instructs the second device control means to write the data stored in the third device, in the second device.

(Supplementary note 10) A data control method includes:
at a CPU which controls data transfer from a first device to a second device in a kernel mode, instructing a first device control means which controls the first device of the CPU to store data read from the first device in a main memory; and at the CPU, instructing a second device control means which controls the second device of the CPU to write the data stored in the main memory, in the second device.

(Supplementary note 11) The data control method described in Supplementary note 10, further includes, at the CPU, performing predetermined processing with respect to the data stored in the main memory before making the write instruction to the second device.

(Supplementary note 12) The data control method described in Supplementary note 10 or 11, further includes, at the CPU, when the first device makes a data transfer request to the second device, repeating the read instruction to the first device control means and the write instruction to the second device until transfer of a requested data amount is completed.

(Supplementary note 13) The data control method described in any one of Supplementary notes 10 to 12, further includes:

at the CPU, allocating an area in which data to be transferred is stored; and at the CPU, freeing the area.

(Supplementary note 14) The data control method described in any one of Supplementary notes 10 to 13, further includes:

at the CPU, creating a read instruction command which indicates the read instruction and a write instruction command which indicates a write instruction, and storing the read instruction command and the write instruction command in an instruction command memory means of the main memory; at the CPU, creating a storage destination list which is a list which indicates a storage destination of transfer data in the main memory, and storing the storage destination list in a storage destination list memory means of the main memory; at the CPU, storing the data read from the first device in the storage destination indicated by the storage destination list, based on the read instruction command stored in the instruction command memory means and the storage destination list; and at the CPU, writing the data read from the storage destination indicated by the storage destination list, in the second device based on the write instruction command stored in the instruction command memory means and the storage destination list.

(Supplementary note 15) The data control method described in Supplementary note 14, further includes, at the CPU, referring to a management information address memory means which stores management information addresses which are addresses which indicate positions at which management information of the first device and the second device is stored, in association with names of the first device and the second device, and creating the read instruction command and the write instruction command based on the management information stored at the positions indicated by the management information addresses.

(Supplementary note 16) The data control method described in any one of Supplementary notes 10 to 15, further includes, at the CPU, making the read instruction to the first device control means for each of a plurality of buffers of the main memory in parallel, and making the write instruction to the second device control means per buffer in parallel.

(Supplementary note 17) The data control method described in any one of Supplementary notes 10 to 16, further includes:

at a CPU which controls data transfer from a first storage device to a second storage device in a kernel mode, instructing a first device control means to store data read from the first storage device in a main memory; and at the CPU, instructing the second device control means to write the data stored in the main memory, in the second storage device.

(Supplementary note 18) The data control method described in any one of Supplementary notes 10 to 17, further includes:

making a read instruction which instructs the first device control means to store the data read from the first device in the third device which stores data to be transferred from the first device to the second device, and a write instruction which instructs the second device control means to write the data stored in the third device, in the second device.

(Supplementary note 19) A data control program which is applied to a computer which has: a CPU which controls data transfer from a first device to a second device in a kernel mode; and a main memory which stores data to be transferred from the first device to the second device, causes the computer to execute: first device control processing of controlling the first device; second device control processing of controlling the second device; and data transfer control processing of making a read instruction which instructs in the first device control processing to store data read from the first device in the main memory, and making a write instruction which instructs in the second device control processing to write the data stored in the main memory, in the second device.

(Supplementary note 20) The data control program described in Supplementary note 19, further causes the computer to, in the data transfer control processing, perform predetermined processing with respect to the data stored in the main memory before making the write instruction to the second device.

(Supplementary note 21) The data control program described in Supplementary note 19 or 20, further causes the computer to, in the data transfer control processing, when the first device makes a data transfer request to the second device, repeat the read instruction in the first device control processing and the write processing in the second device until transfer of a requested data amount is completed.

(Supplementary note 22) The data control program described in any one of Supplementary notes 19 to 21, further causes the computer to execute: area allocating processing of allocating in the main memory an area in which data to be transferred is stored; and area free processing of freeing the area.

(Supplementary note 23) The data control program according to any one of Supplementary notes 19 to 22, further causes the computer to: in the data transfer control processing, create a read instruction command which indicates the read instruction and a write instruction command which indicates a write instruction, and store the read instruction command and the write instruction command in an instruction command memory means of the main memory and create a storage destination list which is a list which indicates a storage destination of transfer data in the main memory, and store the storage destination list in a storage destination list memory means of the main memory; in the first device control processing, store the data read from the first device in the storage destination indicated by the storage destination list, based on the read instruction command stored in the instruction command memory means and the storage destination list; and in the second device control processing, write the data read from the storage destination indicated by the storage destination list, in the second device based on the write instruction command stored in the instruction command memory means and the storage destination list.

(Supplementary note 24) The data control program described in Supplementary note 23, further causes the computer to: in the data transfer control processing, based on management information stored at positions indicated by management information addresses stored by a management information address memory means which stores the management information addresses which are addresses which indicate positions at which the management information of the first device and the second device is stored, in association with names of the first device and the second device, create the read instruction command and the write instruction command.

(Supplementary note 25) The data control program described in any one of Supplementary notes 19 to 24, further causes the computer to: in the data transfer control processing, make a read instruction in the first device control processing for each of a plurality of buffers of the main memory in parallel, and make a write instruction in the second device control processing per buffer in parallel.

(Supplementary note 26) The data control program described in any one of Supplementary notes 19 to 25 which is applied to a computer which has: a CPU which controls data transfer from a first storage device to a second storage device in a kernel mode; and a main memory which stores data to be transferred from the first storage device to the second storage device, further causes the computer to: in the first device control processing, control the first storage device; and in the second device control means, control the second storage device.

(Supplementary note 27) The data control program described in any one of Supplementary notes 19 to 26, further causes the computer to, in the data transfer control processing, make a read instruction which instructs in the first device control processing to store the data read from the first device in a third device which stores data to be transferred from the first device to the second device, and make a write instruction which instructs in the second device control processing to write the data stored in the third device in the second device.

Although the present invention has been described with reference to exemplary embodiments and examples, the present invention is by no means limited to the exemplary embodiments and the examples. The configurations and the details of the present invention can be variously changed within the scope of the present invention which one of ordinary skill in the art can understand.

This application claims priority to Japanese Patent Application No. 2011-044951, filed on Mar. 2, 2011, the entire contents of which are incorporated by reference herein.

INDUSTRIAL APPLICABILITY

The present invention is suitably applied to a computer system which performs control of moving data at a high speed between two I/O devices. Further, the present invention is also suitably applied to a computer system which transfers data at a high speed while processing data to be transferred between two I/O devices.

REFERENCE SIGNS LIST

1 CPU
2 Bridge
3 Main memory
101 I/O data transfer application operating unit
102 Operating system operating unit
103 I/O data transfer driver operating unit
104,105 I/O device driver operating unit
106 I/O data transfer driver operating unit
107 Storage copy application operating unit
108 Storage copy driver operating unit
109,110 Storage device driver operating unit
301 I/O data transfer memory
302,303,304 Program
401,402,403 I/O device
404,405 Storage device
501,502 PCI express bus

What is claimed is:

1. A data control system comprising:
a central processing unit (CPU) which controls data transfer from a first device to a second device in a kernel mode; and
a main memory which is configured to store data to be transferred from the first device to the second device, wherein the CPU comprises:
a first device control unit, implemented by the CPU, which is configured to control the first device;
a second device control unit, implemented by the CPU, which is configured to control the second device; and
a data transfer control unit, implemented by the CPU, which is configured to formulate a read instruction which instructs the first device control unit to store data read from the first device in the main memory, and is configured to formulate a write instruction which instructs the second device control unit to write the data stored in the main memory, in the second device,
wherein the data transfer control unit allocates memory space in the main memory, and creates a direct memory access list in the main memory,
wherein the first device control unit is configured to cause the first device to write data into the memory space using direct memory access with the direct memory access list,
wherein the second device control unit is configured to cause the second device to read the data written by the first device from the memory space using direct memory access with the direct memory access list, and
wherein the data transfer control unit is configured to multiplex and formulate the read instruction and the write instruction in parallel.

2. The data control system according to claim 1, wherein the data transfer control unit performs predetermined processing with respect to the data stored in the main memory before sending the write instruction to the second device.

3. The data control system according to claim 1, wherein, when the second device control unit has completed a process of writing data to the second device, the data transfer control unit repeats the read instruction to the first device control unit and the write instruction to the second device until transfer of a requested data amount is completed.

4. The data control system according to claim 1, further comprising:
an area allocating unit, implemented by the CPU, which allocates in the main memory an area in which data to be transferred is stored; and
an area freeing unit, implemented by the CPU, which frees the area.

5. The data control system according to claim 1, wherein the main memory comprises:
an instruction command memory unit which stores a read instruction command which indicates the read instruction and a write instruction command which indicates a write instruction; and
a storage destination list memory unit which stores a storage destination list which is a list indicating a storage destination of transfer data in the main memory;
the data transfer control unit creates the read instruction command and the write instruction command and stores the read instruction command and the write instruction command in the instruction command memory unit, and creates the storage destination list and stores the storage destination list in the storage destination list memory unit;
the first device control unit stores data read from the first device in the storage destination indicated by the storage destination list, based on the read instruction command stored in the instruction command memory unit and the storage destination list; and
the second device control unit writes data read from the storage destination indicated by the storage destination list, in the second device based on the write instruction command stored in the instruction command memory unit and the storage destination list.

6. The data control system according to claim 5, further comprising
a management information address memory unit which is configured to store management information addresses which are addresses which indicate positions at which management information of the first device and the second device is stored, in association with names of the first device and the second device,
wherein the data transfer control unit creates a read instruction command and a write instruction command based on the management information stored at the positions indicated by the management information addresses.

7. The data control system according to claim 1, wherein:
the main memory comprises a plurality of buffers configured to store transfer data; and
the data transfer control unit which is configured to formulate the read instruction to the first device control unit per buffer in parallel, and which is configured to formulate the write instruction to the second device control unit per buffer in parallel.

8. The data control system according to claim 1, wherein:
the CPU is configured to control data copied from a first storage device to a second storage device in the kernel mode;
the main memory is configured to store data which is to be copied from the first storage device to the second storage device;
the first device control unit is configured to control the first storage device; and
the second device control unit is configured to control the second storage device.

9. A data control method comprising:
operating a central processing unit (CPU), the operation of which:
allocates memory space in a main memory, and creating a direct memory access list in the main memory;
controls data transfer from a first device to a second device in a kernel mode, instructing a first device control unit which controls the first device to store data read from the first device into a main memory, the first device control unit having the first device write data into the memory space using direct memory access with the direct memory access list;
instructs a second device control unit which is configured to control the second device to write the data stored in the main memory into the second device, the second device control unit being configured to cause the second device to read data written by the first device from the memory space using direct memory access with the direct memory access list, and
multiplexes and formulates a read instruction which instructs the first device control unit and a write instruction which instruct the second device control unit in parallel.

10. A non-transitory computer-readable storage medium storing a data control program which is applied to a computer which comprises:
a central processing unit (CPU) which is configured to control data transfer from a first device to a second device in a kernel mode; and
a main memory which is configured to store data to be transferred from the first device to the second device, which when executed by a processor performs a method comprising:
allocating memory space in the main memory and creating a direct memory access list in the main memory;
formulating a read instruction to store data read from the first device in the main memory, the first device being configured to write data into the memory space using direct memory access with the direct memory access list;
formulating a write instruction to write the data stored in the main memory into the second device to have the second device read the data written by the first device from the memory space using direct memory access with the direct memory access list,
multiplexing and formulating the read instruction and the write instruction in parallel.

11. The data control system according to claim 1, wherein the direct memory access list is information obtained by listing addresses in the main memory to allow the first device and the second device to perform data communication with the main memory by way of direct memory access.

12. The data control system according to claim 1, wherein the direct memory access list is loaded into the first device and the second device.

* * * * *